United States Patent
Matsunoshita et al.

(10) Patent No.: US 7,444,036 B2
(45) Date of Patent: Oct. 28, 2008

(54) DEVICE, METHOD, AND RECORDING MEDIUM FOR PROCESSING A DOCUMENT HAVING DOCUMENT DATA AND A SET OF RELATED DATA

(75) Inventors: Junichi Matsunoshita, Nakai-machi (JP); Hirofumi Komatsubara, Nakai-machi (JP); Shinichi Yada, Nakai-machi (JP); Hajime Sugino, Ebina (JP); Takeshi Noguchi, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 711 days.

(21) Appl. No.: 11/058,211

(22) Filed: Feb. 16, 2005

(65) Prior Publication Data
US 2006/0017989 A1  Jan. 26, 2006

(30) Foreign Application Priority Data
Jul. 21, 2004 (JP) ............................. 2004-213558

(51) Int. Cl.
G06K 9/36 (2006.01)
G09G 5/00 (2006.01)
H04N 1/387 (2006.01)
G06F 17/00 (2006.01)
G06F 17/20 (2006.01)
G06F 17/21 (2006.01)
G06F 17/22 (2006.01)
G06F 17/24 (2006.01)
G06F 17/25 (2006.01)
G06F 17/26 (2006.01)
G06F 17/27 (2006.01)
G06F 17/28 (2006.01)

(52) U.S. Cl. ................ 382/284; 345/634; 358/450; 715/230; 715/231; 715/232; 715/233

(58) Field of Classification Search ................ 382/284; 345/630, 634; 348/586, 589; 358/450; 715/230–233
See application file for complete search history.

(56) References Cited

U.S. PATENT DOCUMENTS 5,666,139 A * 9/1997 Thielens et al. ............. 345/173

(Continued)

FOREIGN PATENT DOCUMENTS

JP  A 2002-135556  5/2002

OTHER PUBLICATIONS

Camarda ("Special Edition Using Microsoft Word 2002", by Bill Camarda, Publisher: Que, Jun. 10, 2001, electronic version, 7 extracted pages ).*

(Continued)

Primary Examiner—Yubin Hung
(74) Attorney, Agent, or Firm—Oliff & Berridge, PLC

(57) ABSTRACT

An image processing device processes a document including a document data body and at least one set of related data, and includes a display that displays an image of the document data body and an image of the related data overlaid on the image of the document data body at overlay positions determined for each set of related data and an image data generator that generates printing image data of the document data body of the overlay position when an instruction to print the document is received, regardless of whether or not the related data is displayed.

4 Claims, 5 Drawing Sheets

U.S. PATENT DOCUMENTS

| | | | |
|---|---|---|---|
| 6,332,148 B1 * | 12/2001 | Paine et al. | 715/236 |
| 6,681,043 B1 * | 1/2004 | Lau et al. | 382/173 |
| 6,721,921 B1 * | 4/2004 | Altman | 715/210 |
| 2003/0202213 A1 * | 10/2003 | Saito | 358/1.18 |
| 2005/0138541 A1 * | 6/2005 | Euchner et al. | 715/512 |

OTHER PUBLICATIONS

Camarda ("Special Edition Using Microsoft Word 2000", by Bill Camarda, Publisher: Que, May 6, 1999, electronic version, 9 extracted pages).*

* cited by examiner

: OVERLAPPING REGION

| DATA TYPE | ENCODING METHOD |
|---|---|
| TEXT | pppp |
| IMAGE | qqqq |
| ⋮ | ⋮ |

DEVICE, METHOD, AND RECORDING MEDIUM FOR PROCESSING A DOCUMENT HAVING DOCUMENT DATA AND A SET OF RELATED DATA

BACKGROUND OF THE INVENTION

1. Field of the Invention

The present invention relates to an image processing device that combines a code image with a printing image.

2. Description of the Related Art

In recent years, technology has been developed for adding related data such as a memo or stamp as a label to an electronic document. When a document to which a memo has been added is to be displayed and printed, an image of the memo is overlaid on an image based on the data of the body of the document (document data body), and the overlaid result is displayed and printed.

In this conventional technology, the memo or stamp is combined and printed. Thus, the portion of the document covered by the memo becomes unable to be referenced. The memo or stamp can be placed in a non-displayed state and printed, but in this case, the content of the memo originally added to the electronic document becomes unable to be referenced.

SUMMARY OF THE INVENTION

The present invention has been made in view of the above circumstances and provides an image processing device that makes an entire image of a document body able to be referenced.

According to an aspect of the invention, the image processing device processes a document including a document data body and at least one set of related data, and includes a display that displays an image of the document data body and an image of the related data overlaid on the image of the document data body at overlay positions determined for each set of related data and an image data generator that generates printing image data of the document data body of the overlay position when an instruction to print the document is received, regardless of whether or not the related data is displayed.

According to another aspect of the invention, the image processing device processes a document including a document data body and at least one set of related data, and includes a display that displays an image of the document data body and an image of the related data overlaid on the image of the document data body at overlay positions determined for each set of related data, an image data generator that generates printing image data of the document data body when an instruction to print the document is received, an image data combining unit that, in regard to related data being displayed, combines images of the related data with the printing image data at overlay positions determined for each set of related data, a code image data generator that, in regard to related data not being displayed, generates code image data on the basis of at least one of the related data, and a code image data combining unit that combines the generated code image data with the printing image data combined by the image data combining unit.

BRIEF DESCRIPTION OF THE DRAWINGS

An embodiment of the invention will be described in detail below on the basis of the following figures, wherein.

DETAILED DESCRIPTION OF THE INVENTION

Figure 1:
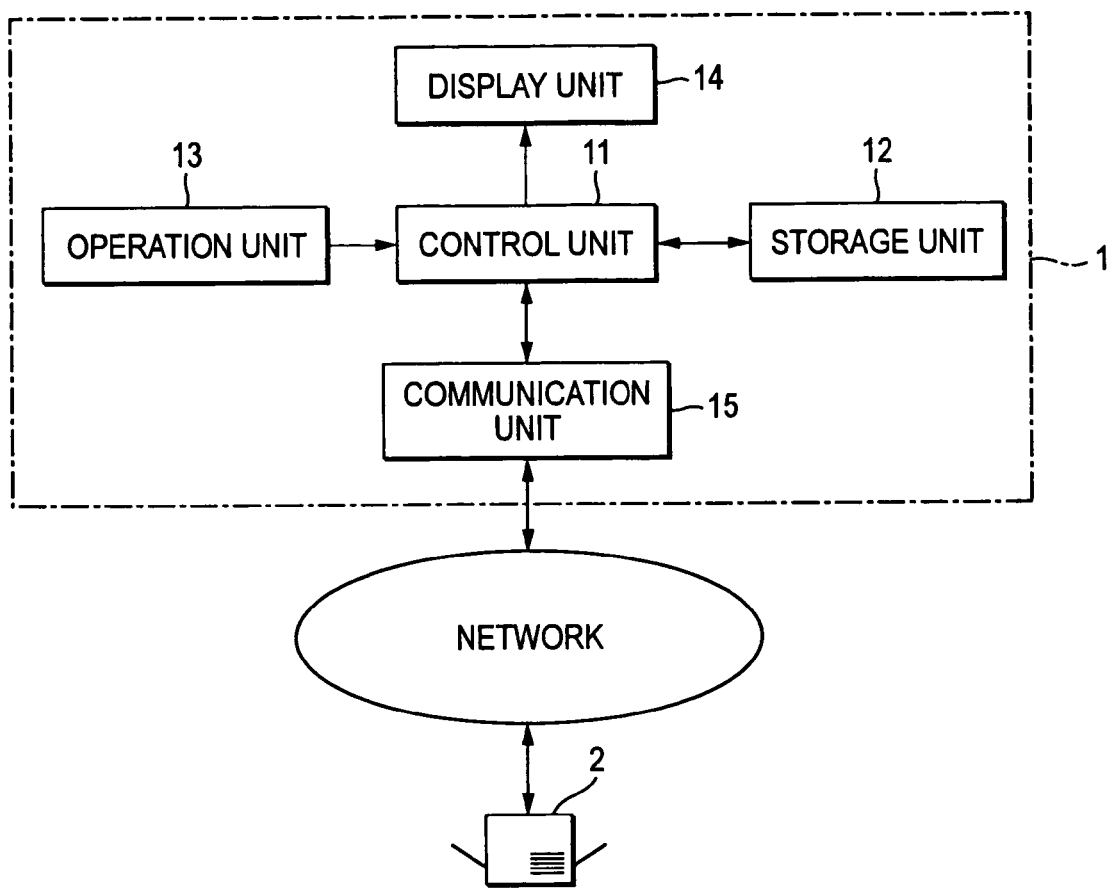
FIG. 1 is a block diagram showing an example of the configuration of an image processing device pertaining to an embodiment of the invention.

An embodiment of the invention will be described with reference to the drawings. As shown in FIG. 1, an image processing device 1 pertaining to the present embodiment includes a control unit 11, a storage unit 12, an operation unit 13, a display unit 14 and a communication unit 15. The image processing device 1 is connected through a network to a printer 2, which is an image forming device.

The control unit 11 is configured by a CPU, operates in accordance with a program stored in the storage unit 12, and conducts processing for editing, displaying and printing a document. When a document including related data is to be printed, the control unit 11 conducts processing for generating, as a printing image, an image based on data of the document body (document data body) without combining an image of the related data and transmits the printing image to the printer 2. The specific content of the processing of the control unit 11 will be described in detail later.

The storage unit 12 includes, in addition to a memory device such as RAM or ROM, a computer-readable recording medium (and a driver that conducts control such as the reading of data from the recording medium) such as a hard disk, a CD-ROM or a DVD-ROM. A program executed by the control unit 11 is stored in a hard disk serving as the storage unit 12 here. The storage unit 12 also operates as a work memory that retains data necessary for the processing of the control unit 11.

The operation unit 13 is a keyboard or mouse operated by a user to output an instruction from the user to the control unit 11. The display unit 14 is a display that displays an image in accordance with an instruction inputted from the control unit 11. The communication unit 15 is connected to the network and transmits data to a destination on the network in accordance with an instruction inputted from the control unit 11. The communication unit 15 also receives data arriving through the network and outputs the data to the control unit 11. The communication unit 15 receives, from the control unit 11, an instruction to transmit image data serving as a printing target to the printer 2, and transmits the image data to the printer 2 through the network.

The document serving as the processing target of the image processing device 1 of the present embodiment includes, in addition to data pertaining to the body of the document (document data body) including strings and graphics, annotation information added as information related to the document. Annotations of a data format such as strings serving as memos, graphics, hyperlinks, voice data, still image data or moving image data can be included in the annotations. Detailed description of the specific structure of the annotation information will be omitted here because the structure is widely known, but the general outline is as follows.

Figure 2:
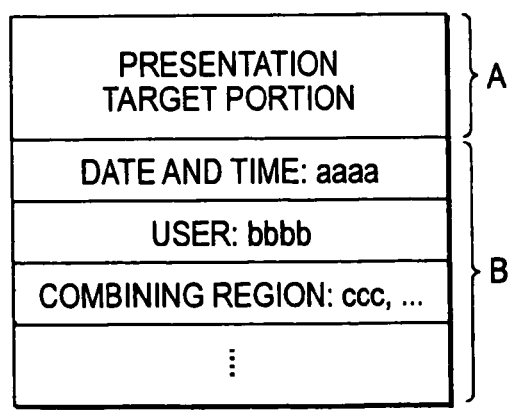
FIG. 2 is a descriptive diagram showing an example of the structure of related data.

The annotation information includes presentation target portion data A, which serve as the source of an image to be displayed and printed, and non-presentation target portion data B, which are not directly included in the printing image (FIG. 2). Here, the non-presentation target portion data B are, for example, the date and time at which the annotation information is generated, information identifying the user who generates the annotation information, and information identifying a region where an image of the annotation information is to be overlaid and combined (combining region). The information identifying the combining region includes, for example, information identifying the page of the document and coordinate information representing the combining region in the identified page. When the combining region is identified by a rectangle, the coordinates are the two vertex coordinates on the diagonal lines of that rectangle.

Figure 3:
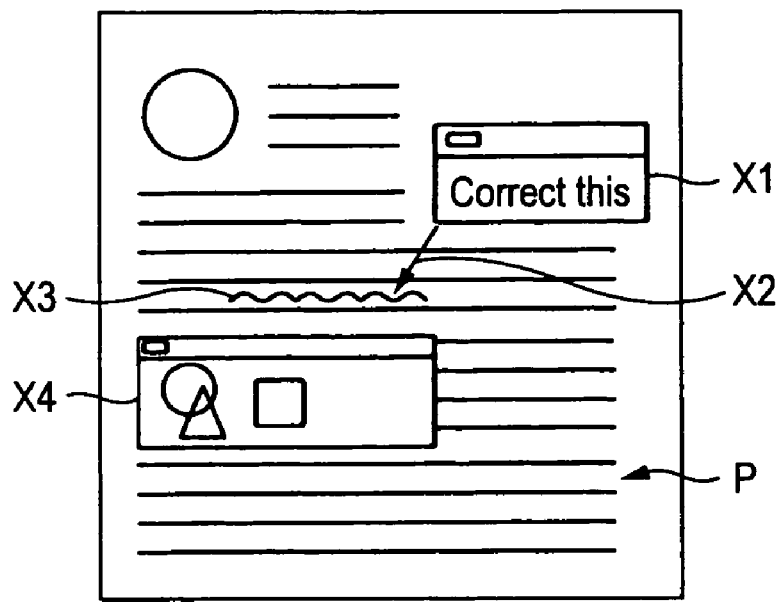
FIG. 3 is a descriptive diagram showing an example of the display of a document to which related data have been added.

The control unit 11 conducts processing for editing, displaying and printing such a document. Specifically, when a document with which annotation information is associated is to be displayed, as shown in FIG. 3, the control unit 11 overlays and displays annotations X1 to X4 on an image of a document body P. Thus, the annotation information is displayed as if labels were adhered to the document. Here, the annotation information includes display setting information for determining whether to display or not to display the presentation target portion of the annotation information as one of the non-presentation target portion data. The control unit 11 references the display setting information and displays the presentation target portion of annotation information set to be displayed. The control unit 11 does not display the presentation target portion of annotation information set not to be displayed based on the display setting information.

Here, the content of processing will be described when the control unit 11 receives an instruction from the user to print a document. The control unit 11 generates image data of only the document body P, outputs the image data as is to the communication unit 15, and causes the communication unit 15 to transmit the image data to the printer 2. Thus, regardless of whether or not the annotation information is being displayed, an image that all of the annotation information added to the image is set not to be displayed is printed.

In the present embodiment, the control unit 11 may also be configured so that, to be able to reproduce the annotation information as related data, the control unit 11 generates code image data based on the annotation information, combines the code image data with the image data of the document body P, outputs the combined image data to the communication unit 15, and causes the communication unit 15 to transmit the combined image data to the printer 2. Here, the combining of the encoded data is conducted as follows. First, the control unit 11 encodes the extracted annotation information. The encoding is conducted using a known error-correcting code. Next, the control unit 11 adds a predetermined base color to the entire background of the image data of the document body P. Here, the base color is, for example, a low-concentration color (e.g., light gray) so that the image quality is not greatly compromised.

Next, the control unit 11 acquires the partial image data of the image data of the document body of the region where the code image is to be combined. Next, the control unit 11 combines the encoded annotation information in the acquired partial image data and generates code image data. Encoded data are combined with the generated code image data so that the image content of the original partial image data can be deciphered. The control unit 11 ecombines the generated code image data in a predetermined region where the code image is to be combined on the image data of the document body.

The region where the code image data are to be combined (combining destination) may be the entire document body P or a predetermined position. In this case, the code image data may include information of the combining region of the annotation information (coordinate information for determining the region on the image data). When the code image data are decoded, the information of the combining region can be used in order to determine the combining region of the image of the annotation information reproduced by decoding.

The information of the combining region is not invariably necessary if the code image data are combined in a region corresponding to the combining region of the original annotation information (corresponding region). In this case, the combining region, on the image of the document body P, of the annotation information reproduced by decoding may be determined on the basis of the position where the code image data are combined.

Figure 4:
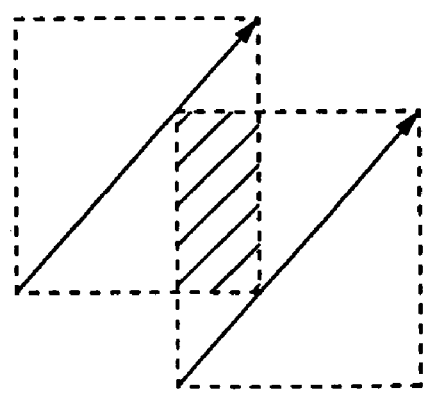
FIG. 4 is a descriptive diagram showing an example where combining regions overlap.

In this case, the control unit 11 checks to see if there is a region where plural combining regions overlap. One example where combining regions overlap would be when images of plural sets of annotation information overlap. In addition, as shown in FIG. 4, when there are plural sets of annotation information pertaining to images of diagonally drawn arrows, and when the combining regions are identified by rectangles (dotted lines in FIG. 4), the combining regions overlap even if the images of the sets of annotation information themselves do not overlap.

Thus, the control unit 11 first uses all combining regions as code image data combining destination candidates, then references the coordinate information of each combining region, and when there are combining regions overlapped each other, the control unit 11 excludes one of them (e.g., the combining region with the smaller area) from the code image data combining destination candidates.

At least some of the non-presentation target portion data included in the annotation information may be used as the encoding target data. For example, the non-presentation target portion data are extracted for each set of annotation information to be printed (annotation information set to be displayed). Then, the code image data are generated on the basis of the extracted non-presentation target portion data and combined with the display image of the extraction source annotation information (image data of presentation target portion data). Thus, a code related to the non-presentation target portion data of the annotation information is combined with the images of each set of annotation information.

With respect to the generation of the code image data, it is not invariably necessary to use a single encoding method. Namely, string data and image data may be encoded using mutually different encoding methods. Specifically, in the present embodiment, a table in which the data types and encoding methods are associated with the specified information (FIG. 5) is stored in advance in the storage unit 12, and the control unit 11 checks the type of encoding target data and references the table to identify the encoding method of that encoding target data from the information associated with the type. Then, the control unit 11 identifies the encoding target data using the identified encoding method. When the encoding target data include plural types of data elements, a different encoding method may be used for each data element. In this case, the control unit 11 may conduct encoding to generate the code image data after rearranging the arrangement order of the data elements using the encoding methods as a key. With respect to encoding target data including plural types of data elements associated with mutually different encoding methods, plural sets of code image data are generated in correspondence with those encoding methods. Then, the plural sets of code image data are combined with the images of the annotation information.

The encoding target data may also include information defining processing for decoding when the encoding target data are decoded on the basis of the code image data. For example, when the encoding target data are image data, the encoding target data may include information defining an application that is started in order to display the image data. Specifically, this information may include information identifying the data type and information identifying the type of application that is to be started.

In the description up to now, an example is described where images of all the annotation information associated with the document are not made into printing targets; rather, only an image based on the data of the document body is made into a printing target. However, the image processing device of the present embodiment is not limited to this.

Namely, the control unit 11 may be configured to select, in accordance with a predetermined selection rule, the annotation information not serving as a printing target. Here, the selection rule may be a rule where the control unit 11 selects annotation information whose display setting information indicates that the annotation information is not to be displayed. The selection rule may also be a rule where the control unit 11 selects annotation information designated by the user. The selection rule may also be a rule where the control unit 11 selects annotation information covering an image of characters or graphics included in the document (this can be determined under the condition that an object included in the document and the combining region of the annotation information overlap).

Figures 5, 6:
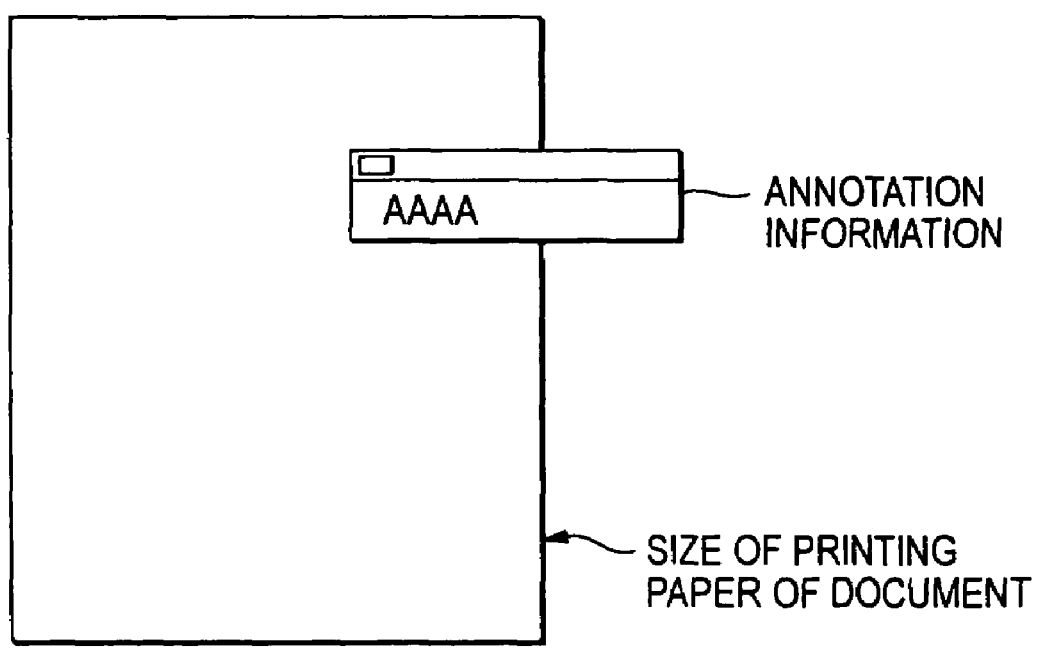
FIG. 5 is a descriptive diagram showing an example of a table in which data types and encoding methods are associated.
FIG. 6 is a descriptive diagram showing an example of related data protruding and displayed outside a display region of a document.

Moreover, the combining region of the annotation information may project from the display region of the document. In other words, the annotation information may be displayed so that it projects outside the display region (rectangle representing the size of the printing paper) of the document (FIG. 6). In this case, the selection rule may be a rule where the control unit 11 selects the annotation information that projects from the display region of the document. The selection rule here may also be a rule where the control unit 11 selects the annotation information on the basis of information included in the annotation information (information concerning the type of annotation information, information concerning the combining region of the annotation information, information concerning the page on which the annotation information is combined, etc.).

Moreover, the selection rule may also be a combination of these. For example, the control unit 11 may be configured to select, as the annotation information not serving as a printing target, annotation information whose display setting information indicates that the annotation information is not to be displayed or annotation information covering an image of characters or graphics included in the document.

When the control unit 11 selects the annotation information not serving as a printing target in this manner, the control unit 11 may be configured to combine an image of the annotation information serving as the printing target with the image data of the document body in the same manner as has conventionally been the case, and print the combined image.

Moreover, the control unit 11 may use, as the encoding target, the annotation information selected in accordance with the selection rule and not serving as the printing target to generate the code image on the basis of at least some of the annotation information serving as that encoding target (e.g., the presentation target portion). The control unit 11 then combines and prints the generated code image on the image on which the image of the annotation information serving as the printing target has been combined.

The control unit 11 may also combine, with the image of the annotation information combined as the printing target, code image data obtained by using at least some of the non-presentation target portion of the annotation information as the encoding target data.

Figure 7A:
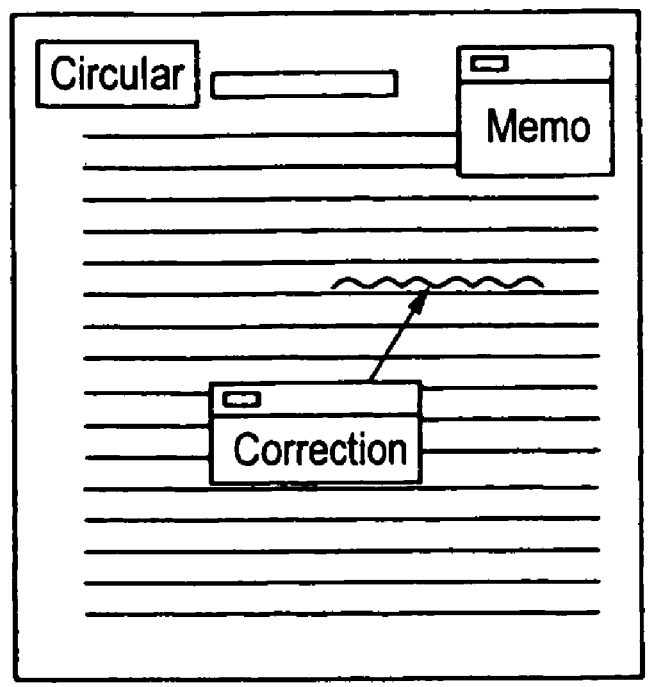
FIGS. 7A and 7B are descriptive diagrams showing examples of the operation of the image processing device pertaining to the embodiment of the invention.
Figure 7B:
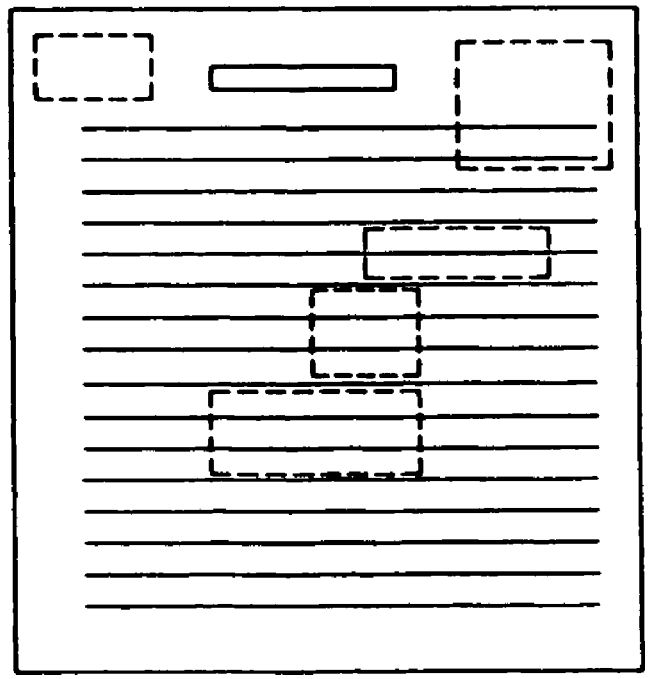

According to the present embodiment, as shown in FIG. 7A, when a document with which annotation information is associated is to be printed, a printing result where that annotation information is not displayed is obtained (FIG. 7B). Here, code image data related to each set of annotation information are combined at positions corresponding to positions where each set of annotation information has been combined (within the dotted line regions of FIG. 7B). Here, the dotted lines shown in FIG. 7B are not actually printed, but are indicated for the purpose of description here.

In this case, the control unit 11 may be configured to conduct the following processing to facilitate the combining of the code image data related to the annotation information.

Namely, the control unit 11 translucently combines a base image at the position corresponding to the combining region of the annotation information corresponding to the code image data. The code image data is combined at the base image portion. Here, the base image may be a graphic filling in the region serving as the target of combining of the code image data. In this case, the color used for the filling may be a predetermined color or a color determined on the basis of the pixel values of the image of the document within the region serving as the target of combining. Specifically, when the control unit 11 determines the region serving as the target of combining of the code image data, the control unit 11 checks the occurrence frequency of the pixel values of the image of the document included in that region, and acquires the value of the highest occurrence frequency (highest frequency value). Then, the control unit 11 references the hue of the color that the highest frequency value represents and determines, with respect to the value of that hue, the value of a hue to serve as a complementary color on that color space. The control unit 11 determines the saturation and brightness to be predetermined values (the control unit 11 selects a brightness and saturation of a relatively low saturation difficult to see with the naked eye), and determines the value of the color including the determined values of the hue, saturation and brightness (complementary color value). Then, the control unit 11 translucently combines, in the region serving as the target of combining, the graphic filled in with the complementary color value. The "translucently combining" here is processing for combining, at a predetermined ratio, a pixel value a before combining and the pixel values serving as the target of combining (in this case, a complementary color value b), or processing for substituting, with the complementary color value b, the pixel values of pixels when the brightness of a pixel value a before combining is brighter than the complementary color value b.

By combining the code image data after disposing the base image of a relatively low saturation in this manner, the code image data become more difficult to see with the naked eye in comparison to a case where the code image data are combined with respect to the color of the paper (e.g., white in the case of common business documents), and the visibility of the printing result can be maintained.

Figure 8:
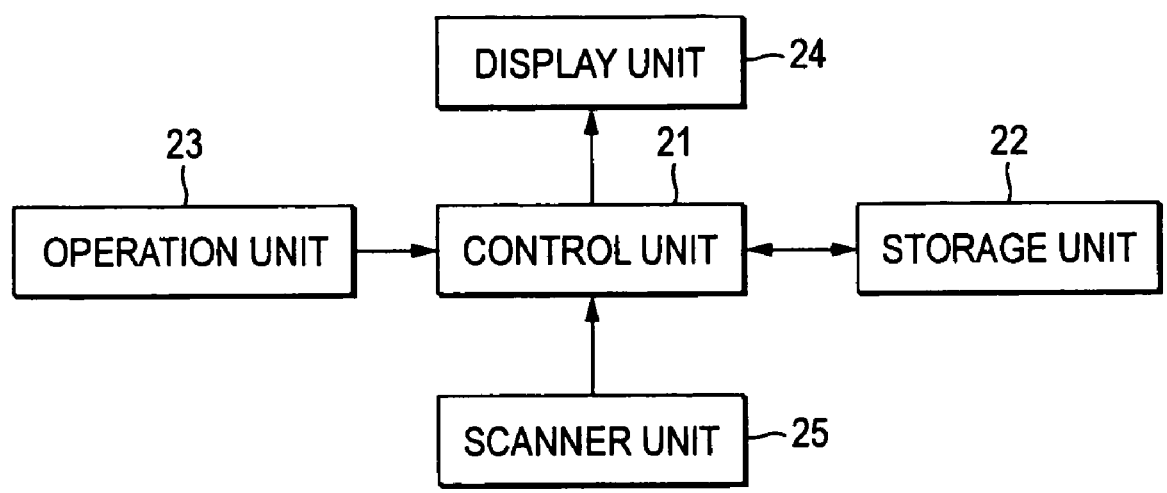
FIG. 8 is a block diagram showing the configuration of a decoding device pertaining to the embodiment of the invention.

Next, a decoding device pertaining to the embodiment of the invention will be described. As shown in FIG. 8, the decoding device of the present embodiment includes a control unit 21, a storage unit 22, an operation unit 23, a display unit 24 and a scanner unit 25.

Here, the control unit 21 is configured by a CPU, operates in accordance with a program stored in the storage unit 22, conducts processing for acquiring and displaying image data read by the scanner unit 25, and conducts processing for decoding code image data included in the image data. The specific content of the processing of the control unit 21 will be described in detail later.

The storage unit 22 includes, in addition to a memory device such as RAM or ROM, a computer-readable recording medium (and a driver that conducts control such as the reading of data from the recording medium) such as a hard disk, a CD-ROM or a DVD-ROM. A program executed by the control unit 21 is stored in a hard disk serving as the storage unit 22 here. The storage unit 22 also operates as a work memory that retains data necessary for the processing of the control unit 21.

The operation unit 23 is a keyboard or mouse operated by a user to output contents of an instruction from the user to the control unit 21. The display unit 24 is a display that displays an image in accordance with an instruction inputted from the control unit 21. The scanner unit 25 optically reads an image formed on paper and outputs the image as image data to the control unit 21.

Here, the operation of the control unit 21 will be described. Specifically, processing will be described when a printed material generated by the image processing device 1 of the present embodiment and printed by the printer 2 (a document where code image data has been combined as shown in FIG. 7B) is read.

The control unit 21 receives the input of image data obtained by reading from the scanner unit 25, and stores the image data in the storage unit 22. The control unit 21 displays the image data (image data of the document body) on the display unit 24. When the control unit 21 receives an instruction from the user to reproduce the annotation information, the control unit 21 identifies the region of the code image data included in the image data stored in the storage unit 22, and decodes information related to the annotation information (i.e., the related data) from the code image data included in the identified region.

The control unit 21 displays the decoded information on the display unit 24. The control unit 21 may also be configured to combine and display, with the image data of the document body, an image generated on the basis of the information related to the annotation information obtained by the decoding. In this case, the position of the combining may be the position of information representing the combining information included in the decoded information, or may be a predetermined position. The control unit 21 may also be configured to use the region of the decoded code image data as the combining region to combine, in the combining region on the image data of the document body, an image generated on the basis of the information related to the annotation information obtained by decoding.

Thus, for example, at least the presentation target portion of the annotation information can be decoded from the code image data, and when the combining region may be acquired, a document including the original annotation information such as shown in FIG. 7A can be reproduced from the image shown in FIG. 7B.

The control unit 21 may also be configured to determine, on the basis of an instruction inputted from the user, whether to combine and display each set of annotation information in the combining regions or not to display each set of annotation information without combining them. By configuring the control unit 21 in this manner, the control unit 21 can handle the annotation information as labels similar to the handling of the annotation information of the document data prior to printing.

In the description up until now, the control unit 11 of the image processing device 1 conducted processing for generating and combining code image data concerning related data, in processing of an application for editing and displaying a document including related data, such as a PDF document. However, the mode of executing the processing is not limited to this.

For example, the processing may also be executed as processing of a printer driver receiving the input of image data of a document body. Namely, the control unit 11 may generate data described by Page Description Language (PDL) as instruction data for causing the image data to be printed by the printer 2, and then add an instruction to combine code image data with the data described by PDL.

Also, in a case where the control unit 11 generates raster image data and transmits the raster image data to the printer 2, and the printer 2 prints the raster image data as is, the processing by the printer driver may be conducted as follows. Namely, the control unit 11 reads the raster image of the portion of the generated raster image data corresponding to the region in which the code image data are to be combined, combines the code image data, and then writes and combines the combined raster image on the read position.

With these methods also, the control unit 11 can generate image data in which the code image data are combined. It will be noted that the control unit 11 may also determine whether or not to combine the code image data on the basis of the type of printer 2 and the settings of the printer driver. For example, when the printer settings are set to print in black and white, the combining of the code image data becomes difficult, so in this case, the control unit 11 may conduct control so that the code image data are not combined.

In addition to described above, some aspects of the invention are outlined below.

An aspect of the invention provides an image processing method for processing a document including a document data body and at least one set of related data including:

displaying an image of the document data body and an image of the related data overlaid on the image of the document data body at overlay positions determined for each set of related data; and generating printing image data of the document data body of the overlay position when an instruction to print the document is received, regardless of whether or not the related data is displayed.

Another aspect of the invention provides a computer-readable recording medium which stores an image processing program including instructions executable by the computer to perform a function for processing a document including a document data body and at least one set of related data including:

displaying an image of the document data body and an image of the related data overlaid on the image of the document data body at overlay positions determined for each set of related data; and generating printing image data of the document data body of the overlay position when an instruction to print the document is received, regardless of whether or not the related data is displayed.

The foregoing description of the embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2004-213558 filed on Jul. 21, 2004 including specification, claims, drawings and abstract is incorporated herein by reference in its entirety.

What is claimed is:

1. An image processing device for processing a document including a document data body and at least one set of related data comprising:
   a display that displays an image of the document data body and an image for each set of related data overlaid on the image of the document data body at an overlay position determined for the set of related data;
   an image data generator that generates printing image data of the document data body of each overlay position when an instruction to print the document is received, regardless of whether or not the corresponding set of related data is displayed;
   a code image data generator that generates code image data for each set of related data on the basis of the set of related data; and
   a code image data combining unit that combines the generated code image data with the printing image data,
   wherein the code image data combining unit combines code image data with the image of the document data body corresponding to an overlay position of the set of related data corresponding to the generated code image data, translucently combines a base image with the printing image data corresponding to the overlay position of the set of related data corresponding to the generated code image data, and combines the generated code image data with the base image portion.

2. An image processing device for processing a document including a document data body and at least one set of related data comprising:
   a display that displays an image of the document data body and an image for each set of related data overlaid on the image of the document data body at an overlay position determined for the set of related data;
   an image data generator that generates printing image data of the document data body when an instruction to print the document is received;
   an image data combining unit that, in regard to each set of related data being displayed, combines its corresponding image with the printing image data at the overlay position determined for the set of related data;
   a code image data generator that, in regard to each set of related data not being displayed, generates code image data on the basis of the set of related data; and
   a code image data combining unit that combines the generated code image data with the printing image data combined by the image data combining unit,
   wherein the code image data combining unit combines code image data with the document data body corresponding to an overlay position of the related data corresponding to the generated code image data, translucently combines a base image with the printing image data corresponding to the overlay position of the set of related data corresponding to the generated code image data, and combines the generated code image data with the base image portion.

3. An image processing method for processing a document including a document data body and at least one set of related data comprising:
   displaying an image of the document data body and an image for each set of related data overlaid on the image of the document data body at an overlay position determined for the set of related data; and
   generating printing image data of the document data body each overlay position when an instruction to print the document is received, regardless of whether or not the corresponding set of related data is displayed;
   generating code image data for each set of related data on the basis of the set of related data;
   combining the generated code image data with the printing image data;
   combining the code image data with the image of the document data body corresponding to an overlay position of the set of related data corresponding to the generated code image data;
   translucently combining a base image with the printing image data corresponding to the overlay position of the set of related data corresponding to the generated code image data; and
   combining the generated code image data with the base image portion.

4. A computer-readable recording medium which stores an image processing program including instructions executable by the computer to perform a function for processing a document including a document data body and at least one set of related data comprising:
   displaying an image of the document data body and an image for each set of related data overlaid on the image of the document data body at an overlay position determined for the set of related data; and
   generating printing image data of the document data body of each overlay position when an instruction to print the document is received, regardless of whether or not the corresponding set of related data is displayed;
   generating code image data for each set of related data on the basis of the set of related data;
   combining the generated code image data with the printing image data;
   combining the code image data with the image of the document data body corresponding to an overlay position of the set of related data corresponding to the generated code image data;
   translucently combining a base image with the printing image data corresponding to the overlay position of the set of related data corresponding to the generated code image data; and
   combining the generated code image data with the base image portion.

* * * * *